United States Patent [19]
Kurashima et al.

[11] Patent Number: 5,831,691
[45] Date of Patent: Nov. 3, 1998

[54] TOUCH PANEL HAVING SPACERS ARRANGED ON VERTEXES OF ORTHOGONAL HEXAGONS

[75] Inventors: Shigemi Kurashima; Akihiko Sakaguchi; Katsuhiro Kurasawa, all of Kawasaki, Japan

[73] Assignee: Fujitsu Limited, Kawasaki, Japan

[21] Appl. No.: 805,776

[22] Filed: Feb. 25, 1997

Related U.S. Application Data

[62] Division of Ser. No. 524,575, Sep. 7, 1995, Pat. No. 5,640,258.

[30] Foreign Application Priority Data

Jan. 27, 1995 [JP] Japan ..................... 7-011755

[51] Int. Cl.⁶ ................ G02F 1/1333; G02F 1/1335; G09G 5/00; G08C 21/00
[52] U.S. Cl. .............. 349/23; 349/12; 349/155; 345/156; 345/173; 178/18
[58] Field of Search ................ 349/23, 155, 12; 178/18; 345/173, 156

[56] References Cited

U.S. PATENT DOCUMENTS

| | | | |
|---|---|---|---|
| 4,725,696 | 2/1988 | Furakawa et al. | 178/18 |
| 4,745,241 | 5/1988 | Furukawa et al. | 178/18 |
| 4,870,458 | 9/1989 | Shibuya et al. | 355/200 |
| 5,111,316 | 5/1992 | Nobile et al. | 359/52 |
| 5,528,266 | 6/1996 | Arbeitman et al. | 345/173 |
| 5,543,587 | 8/1996 | Ikura et al. | 178/18 |
| 5,543,588 | 8/1996 | Bisset et al. | 345/173 |
| 5,563,632 | 10/1996 | Roberts | 345/173 |
| 5,623,280 | 4/1997 | Akins et al. | 345/104 |
| 5,668,353 | 9/1997 | Matsuda et al. | 178/18 |
| 5,670,755 | 9/1997 | Kwon | 178/19 |

FOREIGN PATENT DOCUMENTS

| | | |
|---|---|---|
| 63-124027 | 5/1988 | Japan . |
| 6-294955 | 10/1994 | Japan . |

*Primary Examiner*—William L. Sikes
*Assistant Examiner*—Toan Ton
*Attorney, Agent, or Firm*—Staas & Halsey

[57] ABSTRACT

A touch panel includes a display unit having display elements which are arranged in a first lattice, and an input panel, put on the display unit, having a structure in which transparent resistive films maintained at a predetermined distance by insulating dot spacers are provided on a transparent substrate, the insulating dot spacers being arranged in a second lattice, wherein a relative angle θ between a direction in which the display elements are arranged in the first lattice and a direction in which the insulating dot spacers are arranged in the second lattice falls in a range of $15° \leq \theta \leq 30°$.

7 Claims, 6 Drawing Sheets

TOUCH PANEL HAVING SPACERS ARRANGED ON VERTEXES OF ORTHOGONAL HEXAGONS

This application is a division of application Ser. No. 08/524,575, filed Sep. 7, 1995, now allowed, U.S. Pat. No. 5,640,258.

BACKGROUND OF THE INVENTION (1) Field of the Invention

The present invention generally relates to a touch panel (an input device), and more particularly to a touch panel having a structure in which an input panel outputting signals corresponding to positions at which a pen or a finger presses on the input panel is on a display panel, such as an LCD (liquid crystal display) panel, having display elements arranged in a lattice.

(2) Description of the Related Art

A conventional touch panel (input device) of this type has a structure as shown in FIGS. 1A, 1B and 1C.

FIG. 1A shows a cross-sectional view of the touch panel. Referring to FIG. 1A, the touch panel has a structure in which an input panel 20 is on a display surface of a liquid crystal display (hereinafter referred to as an LCD) panel 10. The input panel outputs signals corresponding to positions at which a pen or a finger presses. The input panel 20 has transparent resistive films 21 and 22, a glass substrate 23 and a protection film 24. A plurality of dot spacers 30 are interposed between the transparent resistive films 21 and 22 so that the transparent resistive films 21 and 22 are maintained at a predetermined distance. Each of the dot spacers 30 is made of an insulating material. The transparent resistive film 22 is fixed on the glass substrate 23, and a top surface of the transparent resistive film 21 is covered by the protection film 24.

When a pen or a finger presses at a position on the protection film 24 of the input panel 20, the transparent resistive films 21 and 22 are brought into contact with each other at the position. The position at which the transparent resistive films 21 and 22 are in contact with each other is electrically detected.

A distance between each two of the dot spacers 30 two-dimensionally arranged effects a load (an input load) by which a pressing position on the input panel 20 can be detected. Thus, in order that input operations can be smoothly performed with a constant load all over the input panel 20, it is preferable that the dot spacers 30 should be two-dimentionally arranged at constant intervals. Thus, the dot spacers 30 are generally on lattice points of a lattice having a lattice distance d1 as shown in FIG. 1B. The lattice distance d1 is decided so that input operations can be performed with a predetermined input load.

In addition, as shown in FIG. 1C, display elements (display dots) 15 are on lattice points of a lattice having a lattice distance d2 on a display surface of the LCD panel 10.

Conventionally, a relationship between a first lattice in which the display dots 15 of the LCD panel 10 are arranged and a second lattice in which the dot spacers 30 in the input panel 20 are arranged has been not studied. In general, the input panel 20 is set on the LCD panel 10 such that two-dimensional directions (A21, A22) in which the display dots 15 of the LCD panel 10 are arranged in the first lattice are respectively equal to two-dimensional directions (A11, A12) in which the dot spacers 30 in the input panel 20 are arranged in the second lattice.

In the touch panel having the conventional structure described above, moire fringes may appear on the input panel 20. This may be caused by overlapping two types of lattices with each other. That is, interference of the display dots 15 arranged in the first lattice with the dot spacers 30 arranged in the second lattice may cause moire fringes on the input panel 20. The moire fringes on the input panel 20 deteriorates the display quality.

SUMMARY OF THE INVENTION

Accordingly, a general object of the present invention is to provide a novel and useful touch panel in which the disadvantages of the aforementioned prior art are eliminated.

A specific object of the present invention is to provide a touch panel in which an input panel having dot spacers two-dimensionally arranged and a display unit having display dots arranged in a lattice are integrated with each other such that moire fringes hardly appear.

The above objects of the present invention are achieved by a touch panel comprising: a display unit having display elements which are arranged in a first lattice, and an input panel, put on said display unit, having a structure in which transparent resistive films maintained at a predetermined distance by insulating dot spacers are provided on a transparent substrate, the insulating dot spacers being arranged in a second lattice, wherein a relative angle θ between a direction in which the display elements are arranged in the first lattice and a direction in which the insulating dot spacers are arranged in the second lattice falls in a range of 15°≦θ≦30°.

It is preferable that the above relative angle θ falls in a range of 20°≦θ≦25°.

The above objects of the present invention are achieved by a touch panel comprising: a display unit having display elements which are arranged in a first lattice; and an input panel, put on said display unit, having a structure in which transparent resistive films maintained at a predetermined distance by insulating dot spacers are provided on a transparent substrate, the insulating dot spacers being arranged in a second lattice, wherein a relative angleθ between a direction in which the display elements are arranged in the first lattice and a direction in which the insulating dot spacers are arranged in the second lattice falls in a range of 0°<θ<15°, and wherein a value "a" (a≧0) representing a relationship between a lattice interval of the first lattice and a lattice interval of the second lattice satisfies a condition of $$\frac{d(1+a)}{\sqrt{(1+a-\cos\theta)^2+\sin^2\theta}} \leq 2 \text{ millimeters}$$

the lattice interval being an interval between adjacent lines of the lattice, the lattice intervals of the first lattice and the second lattice respectively having values d and d(1+a) or d(1+a) and d.

The above objects of the present invention are also achieved by a touch panel comprising: a display unit having display elements which are arranged in a first lattice; and an input panel, put on said display unit, having a structure in which transparent resistive films maintained at a predetermined distance by insulating dot spacers are provided on a transparent substrate, the insulating dot spacers being arranged in a second lattice, wherein a relative angle θ between a direction in which the display elements are arranged in the first lattice and a direction in which the insulating dot spacers are arranged in the second lattice falls in a range of $30°<\theta<45°$, and wherein a value "a" ($a\geqq 0$) representing a relationship between a lattice interval of the first lattice and a lattice interval of the second lattice satisfies a condition of $$\frac{d'(1+a')}{(1+a'-\cos(45°-\theta))^2+\sin^2(45°-\theta)} \leqq 2 \text{ millimeters}$$

where a' is either $\sqrt{2}/(1+a)-1$ or $(1+a)/\sqrt{2}-1$ and is equal to or greater than zero, and d' is a smaller one of d and $d(1+a)/\sqrt{2}$, the lattice interval being an interval between adjacent lines of the lattice, the lattice intervals of the first lattice and the second lattice respectively having values d and $d(1+a)$ or $d(1+a)$ and d.

The above objects of the present invention are also achieved by a touch panel comprising: a display unit having display elements arranged in a lattice; and an input panel, put on said display unit, having a structure in which transparent resistive films maintained at a predetermined distance by a plurality of insulating dot spacers two-dimensionally arranged are provided on a transparent substrate, wherein said plurality of insulating dot spacers are on vertexes of orthogonal hexagons spread on a plane.

Furthermore, the above objects of the present invention are achieved by a touch panel comprising: a display unit having display elements arranged in a lattice; and an input panel, put on said display unit, having a structure in which transparent resistive films maintained at a predetermined distance by a plurality of insulating dot spacers two-dimensionally arranged are provided on a transparent substrate, wherein said plurality of insulating dot spacers are arranged on concentric circles arranged at constant intervals so that an angle formed of lines connecting a center of the concentric circles and adjacent insulating dot spacers on an n-th concentric circle is equal to C/n radian where C is a constant and n is an integer.

According to the present invention, intervals of the moire fringes to be formed on the input panel can be small, so that the moire fringes hardly appear on the input panel. That is, the moire fringes are not an eyesore for a user.

BRIEF DESCRIPTION OF THE DRAWINGS

Other objects, features and advantages of the present invention will be apparent from the following detailed description when read in conjunction with the accompanying drawings, in which.

DESCRIPTION OF THE PREFERRED EMBODIMENT

A description will be given, with reference to FIGS. 2 through 6, of the principle of a first embodiment of the present invention.

Figure 1A:
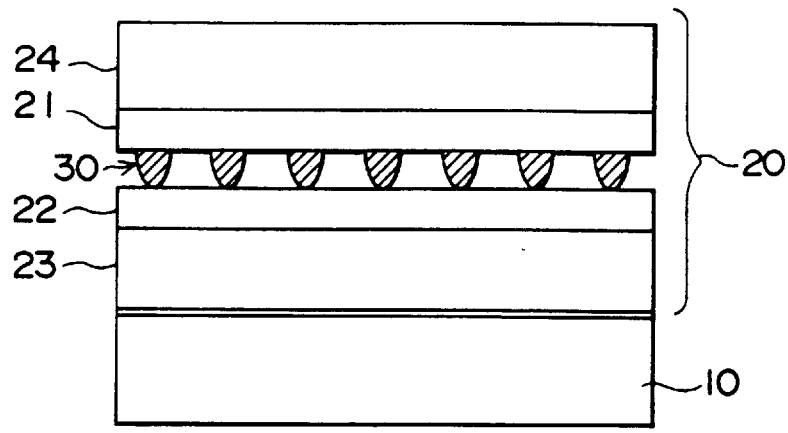
FIGS. 1A, 1B and 1C are diagrams illustrating a structure of a conventional touch panel (an input device)

A touch panel according to this embodiment of the present invention has the display unit 10 and the input panel 20 which are integrated with each other as shown in FIG. 1A. The display dots 15 of the display unit 10 and the dot spacers 30 of the input panel 20 are arranged as shown in FIG. 2.

Figure 2:
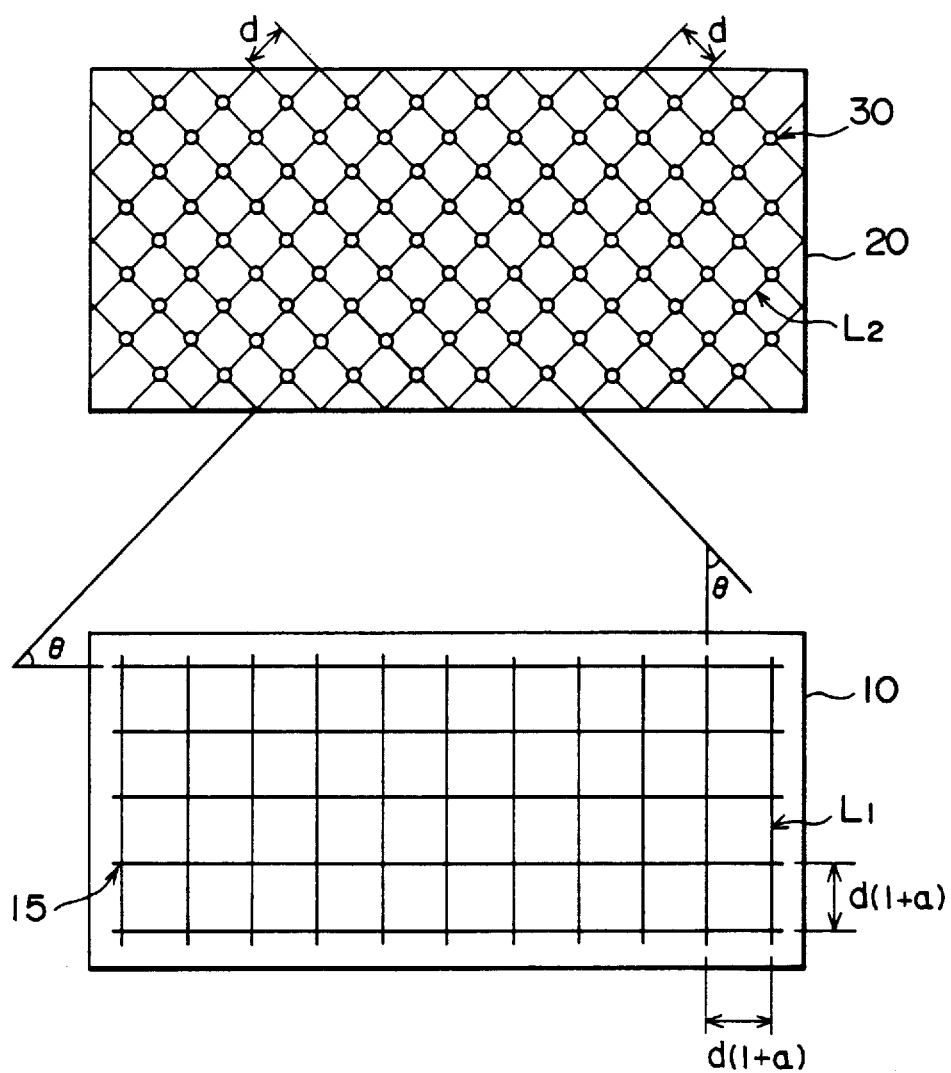
FIG. 2 is a diagram illustrating an arrangement of dot spacers of an input panel and an arrangement of display dots of a display panel in a touch panel according to a first embodiment of the present invention.

Referring to FIG. 2, in the display unit 10, the display dots 15 are on lattice points of a first lattice L1. In the input panel 20, the dot spacers 30 which are made of an insulating material are on lattice points of a second lattice L2. An angle between a direction in which the display dots 15 are arranged in the first lattice L1 and a direction in which the dot spacers 30 are arranged in the second lattice L2 is set at $\theta$. In a case where lines of the first lattice L1 are parallel to edges of the display unit 10, since the display unit 10 and the input panel are integrated into the touch panel such that edges of the display unit 10 and the input panel 20 are overlapped, an angle between a direction in which an edge of the input panel extends and a direction in which the dot spacers 30 are arranged in the second lattice 12 may be set at $\theta$.

The first lattice L1 has a lattice interval $d(1+a)$, and the second lattice L2 has a lattice interval d. The lattice interval is an interval between adjacent lines of the lattice. A constant "a" represents a relationship between the lattice intervals of both the lattices L1 and L2 and is equal to or greater than zero. For example, when the constant a is equal to zero (a=0), the lattice intervals of the lattices L1 and L2 are equal to each other.

Figure 1B:
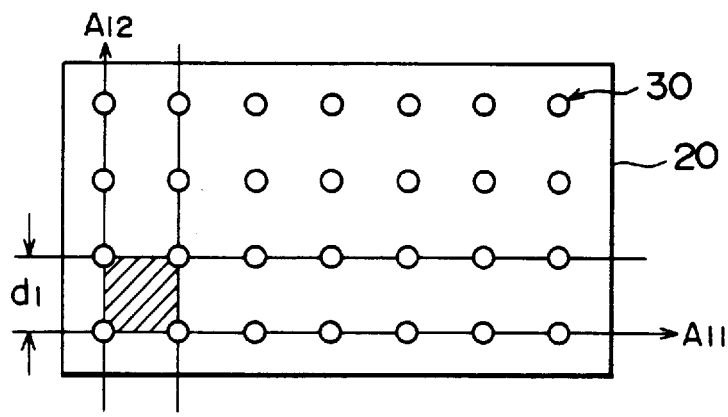
Figure 1C:
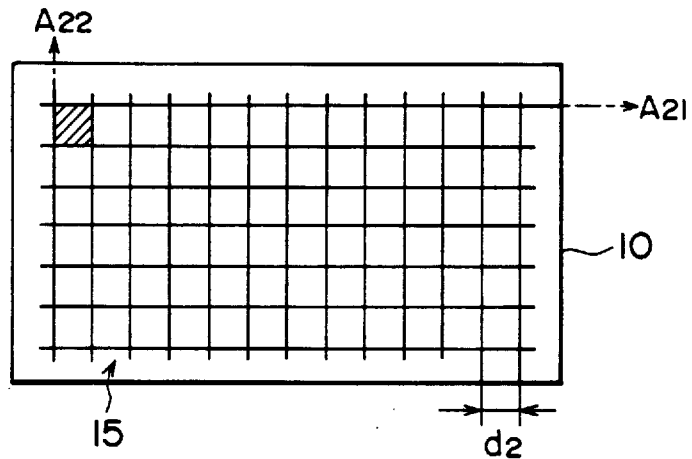
Figure 3:
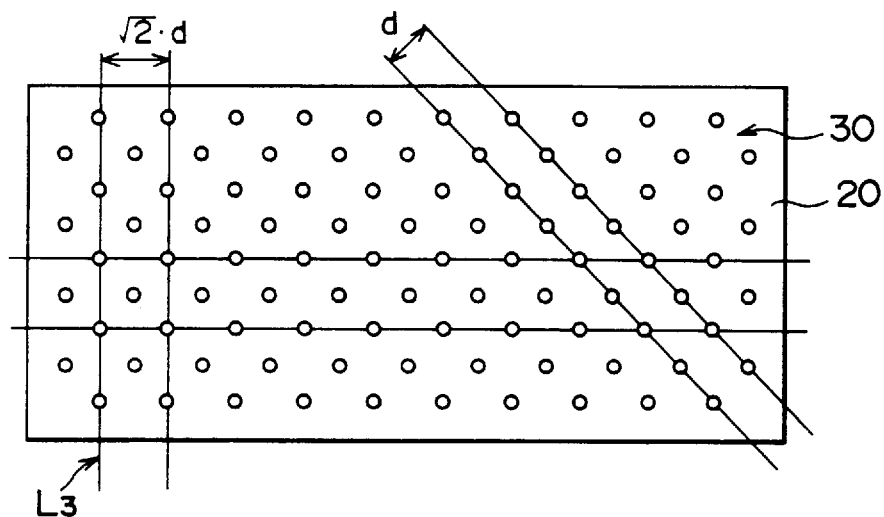
FIG. 3 is a diagram illustrating lattices in which the dot spacers of the input panel may be arranged.
Figure 4:
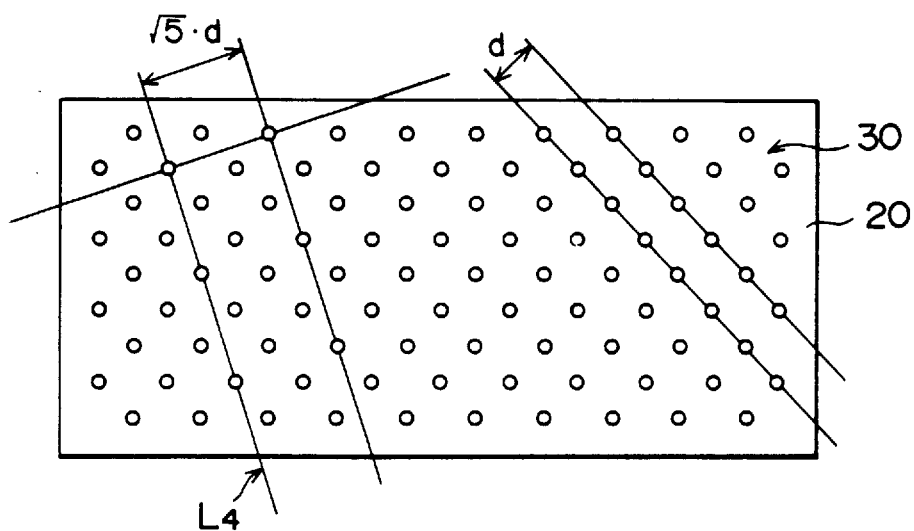
FIG. 4 is a diagram illustrating other lattices in which the dot spacers of the input panel may be arranged.

In general, in a case where two lattices are overlapped, points at which the lattices cross periodically appear. Thus, it is thinkable that brightness and darkness in the moire fringes periodically appear on points at which a lattice provided with an arrangement of the display elements (display dots) 15 of the display unit 10 and a lattice provided with an arrangement of the dot spacers 30 of the input panel 20 cross each other in a plan view. The dot spacers 30 are originally arranged in the second lattice L2 (as shown in FIG. 1). It is thinkable that parts of the dot spacers 30 are also arranged in a lattice L3 having a lattice interval $\sqrt{2}\cdot d$ as shown in FIG. 3, and it is further thinkable that parts of the dot spacers 30 are arranged in a lattice L4 having a lattice interval $\sqrt{5}\cdot d$ as shown in FIG. 4. As has been described above, it is thinkable that parts of the dot spacers 30 originally arranged in the second lattice L2 are also arranged in various lattices. However, actually, consideration of reflection of the second lattice L2 having the smallest lattice interval "d" and the lattice L3 having the next smallest lattice interval "$\sqrt{2}\cdot d$" is enough for a study of the generation of moire fringes. Thus, descriptions will now be given of the moire fringes generated based on a relationship between the first lattice L1 and the second lattice L2 and the moire fringes generated based on a relationship between the first lattice L1 and the lattice L3.

First, the moire fringes generated based on the relationship of the first lattice L1 and the second lattice L2 will be described.

Figure 5:
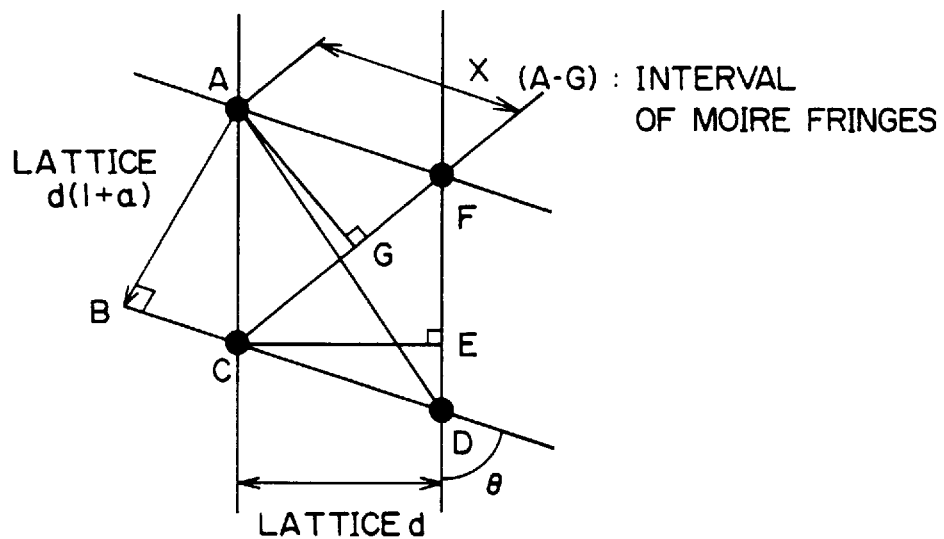
FIG. 5 is a modeling diagram illustrating two crossing lattices causing an appearance of the moire fringes.

In a model in which a pair of lines of the second lattice L2, which lines are separated by "d", crosses a pair of lines of the first lattice L1, which lines are separated by "d(1+a)", bright dots and dark dots of the moire fringes are formed on points A, C, D and F at which the lines of the first lattice L1 and the lines of the second lattice L2 cross each other, as shown in FIG. 5. From a geometrical relationship in this model, an interval $x_1$ (A–G) of the moire fringes are represented by the following formula.

$$x_1 = \frac{d(1+a)}{\sqrt{(1+a-\cos\theta)^2 + \sin^2\theta}} \quad (1)$$

The smaller the interval $x_1$ of the moire fringes, the more difficult it becomes to see the moire fringes.

Next, the moire fringes generated based on the first lattice L1 and the lattice L3 will be described.

In this case, the lattice L3 is rotated by 45° ($\pi/4$ radians) with respect to the second lattice L2. The lattice L3 has the lattice interval $\sqrt{2}\cdot d$. Using these conditions, the above formula (1) is transformed to the following formula representing an interval $x_2$ of the moire fringes.

$$x_2 = \frac{d'(1+a')}{\sqrt{(1+a'-\cos(45°-\theta))^2 + \sin^2(45°-\theta)}} \quad (2)$$

where a' is either $\sqrt{2}/(1+a)-1$ or $(1+a)/\sqrt{2}-1$ and is equal to or greater than zero ($a \geq 0$), and d' is a smaller one of d and $d(1+a)/\sqrt{2}$.

Figure 6:
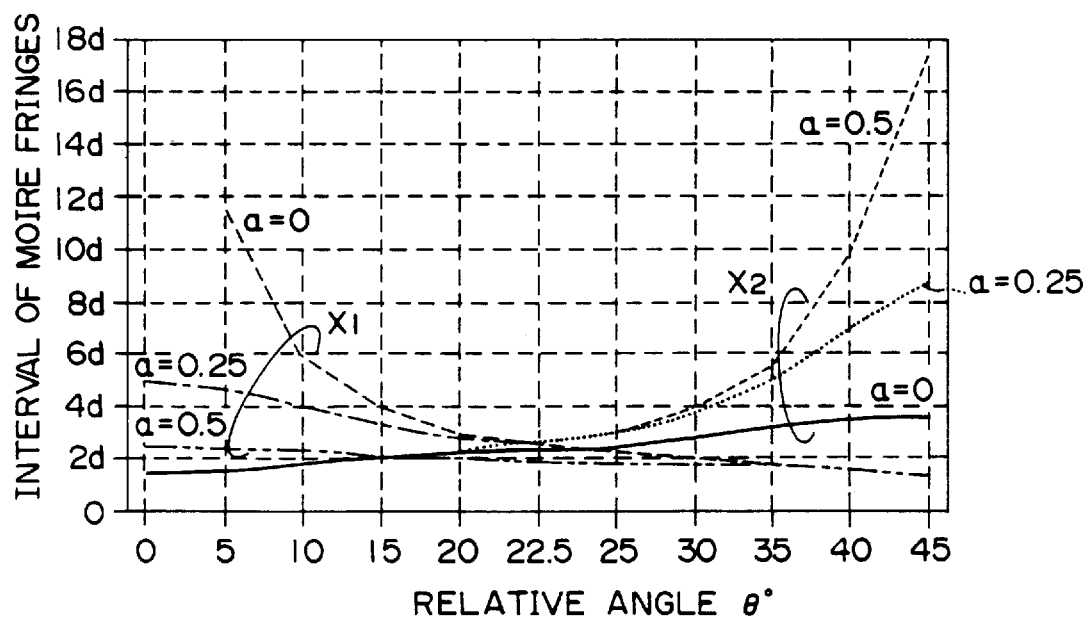
FIG. 6 is a graph illustrating calculated intervals of the moire fringes.

The intervals $x_1$ and $x_2$ of the moire fringes respectively represented by the above formulas (1) and (2) vary, as shown in FIG. 6, in accordance with the relative angle θ between the first lattice L1 and the second lattice L2 in respective parameters "a".

Referring to FIG. 6, when the relative angle θ falls within a range of $$15° \leq \theta \leq 30°,$$

both the intervals $x_1$ and $x_2$ of the moire fringes are small in the respective parameters "a". For example, in a case where the relative angle θ is equal to 30° (θ=30°) and a is equal to 0.5 (a=0.5), the interval $x_2$ has the maximum value of about 4d. In this case, if the lattice interval d of the second lattice L2 is equal to 0.5 millimeters (d=0.5 mm), the interval $x_2$ of the moire fringes is equal to about 2 millimeters (mm). In addition, in a case where the relative angle θ is equal to 15°(θ=15°) and a is equal to zero (a=0), the interval $x_1$ has the maximum value of about 4d. Experimentally, it is difficult to see moire fringes having intervals equal to or less than 2 millimeters.

Further, referring to FIG. 6, when the relative angle θ falls within a range of $$20° \leq \theta \leq 25°,$$

both the intervals $x_1$ and $x_2$ are both sufficiently small.

Furthermore, referring to FIG. 6, when the relative angle θ falls within a range of $$0° < \theta < 15°,$$

the interval $x_2$ of the moire fringes is sufficiently small but the interval $x_1$ of the moire fringes greatly depends on the parameter "a" indicating the relationship between the lattice intervals of the first and second lattices L1 and L2. Thus, in this case, if the interval $x_1$ of the moire fringes is equal to or less than 2 millimeters, it is difficult to see the moire fringes. That is, if the parameter "a" indicating the relationship between the lattice intervals of the first and second lattices L1 and L2 is adjusted so that the following relationship is satisfied, it can be difficult to see the moire fringes in the above range (0°<θ<15°).

$$x_1 = \frac{d(1+a)}{\sqrt{(1+a-\cos\theta)^2 + \sin^2\theta}} \leq 2 \text{ (mm)}$$

In addition, referring to FIG. 6, when the relative angle θ falls within a range of $$30° < \theta < 45°,$$

the interval $x_1$ of the moire fringes is sufficiently small, but the interval $x_2$ of the moire fringes greatly depends on the parameter "a" indicating the relationship between the lattice intervals of the first and second lattices L1 and L2. Thus, in this case, if the interval $x_2$ of the moire fringes is equal to or less than 2 millimeters, it is difficult to see the moire fringes. That is, if the parameter "a" indicating the relationship between the lattice intervals of the first and second lattices L1 and L2 is adjusted so that the following relationship is satisfied, it can be difficult to see the moire fringes in the above range (30°<θ<45).

$$x_2 = \frac{d'(1+a')}{\sqrt{(1+a'-\cos(45°-\theta))^2 + \sin^2(45°-\theta)}} \leq 2 \text{ (mm)}$$

where a' is either $\sqrt{2}/(1+a)-1$ or $(1+a)/\sqrt{2}-1$ and is equal to or greater than zero ($a \leq 0$), and d' is a smaller one of d and $d(1+a)/\sqrt{2}$.

In the above description, the first lattice L1 has the lattice interval of d(1+a) and the second lattice L2 has the lattice interval of d. However, in contrast with this, the first lattice L1 and the second lattice L2 may have respectively lattice intervals of d and d(1+a).

A description will now be given of an experiment.

In this experiment, a touch panel having the same structure as that shown in FIG. 1A was used. That is, the input panel 20 formed of the glass substrate 23, the transparent resistive films 21 and 22 and the protection film 24 is provided on the LCD panel 10. The transparent resistive films 21 and 22 are separated at a predetermined interval by the dot spacers 30. The dot spacers 30 of the input panel 10 and the display elements 15 (display dots) of the LCD panel (the display unit) 10 are respectively arranged in the lattices L1 and L2. Under the following conditions, appearance of moire fringes on the input panel 20 was observed.

LATTICE INTERVAL d OF LATTICE L2:
d=0.25 millimeters
LATTICE INTERVAL d(1+a) OF LATTICE L1:
d(1+a)=0.33 millimeters
DIFFERENCE a BETWEEN THE LATTICE INTERVALS OF LATTICES L1 AND L2: a=0.320

Figure 7:
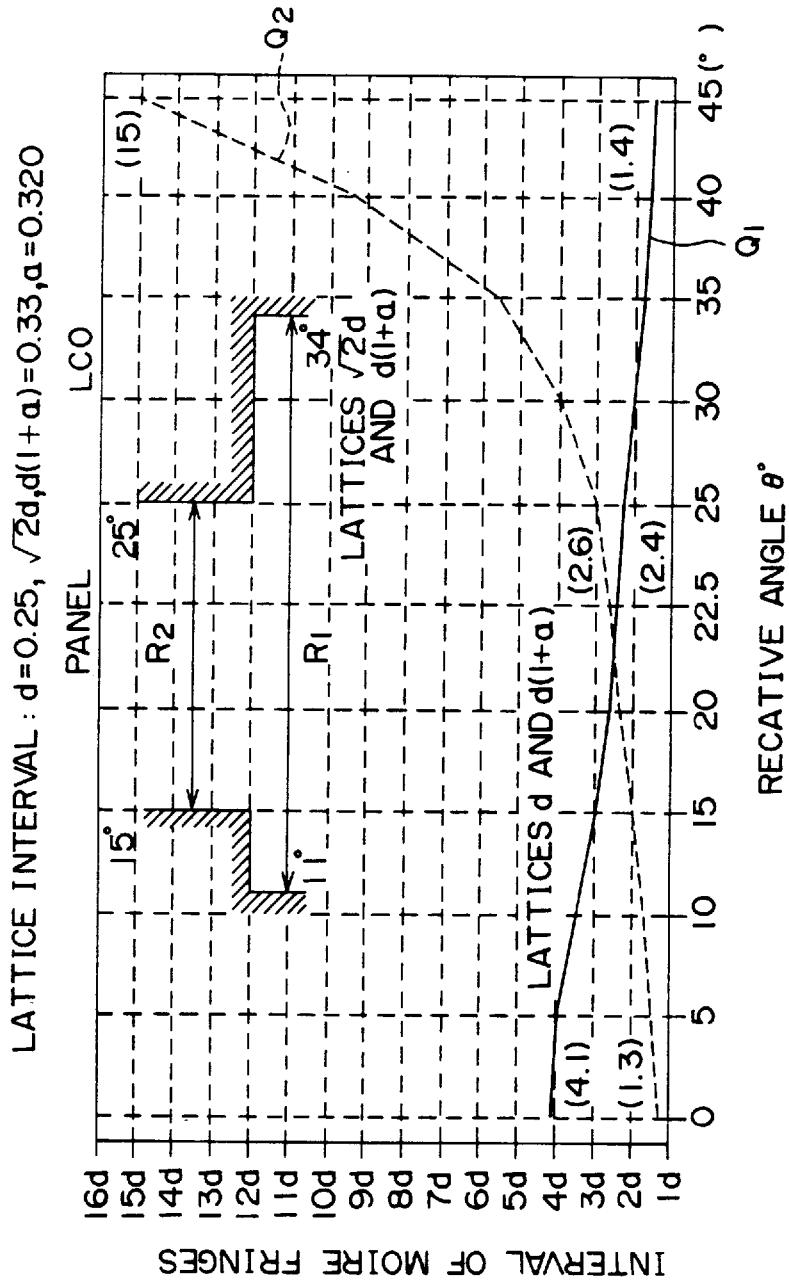
FIG. 7 is a graph illustrating intervals of the moire fringes which are calculated under predetermined conditions and a range in which the moire fringes actually appear.

Results as shown in FIG. 7 were obtained. Referring to FIG. 7, in a case where a non-glare film which was cloudy was used as the protection film 24, when the relative angle θ between a direction in which the display dots 15 were arranged in the lattice L1 and a direction in which the dot spacers 30 were arranged in the lattice L2 was within a range R1 from about 11° to about 34°, it was difficult to see the moire fringes. In addition, in a case where the protection film 24 is removed, when the relative angle θ was within a range R2 from about 15° to about 25°, it was difficult to see the moire fringes.

Further, under the above conditions, the interval $x_1$ of the moire fringes calculated based on the lattices having the lattice intervals d and d(1+a) varies in accordance with the relative angle θ as shown by a curve Q1 shown in FIG. 7. The interval $x_2$ of the moire fringes calculated based on the lattices having the intervals $\sqrt{2}d$ and d(1+a) varies in accordance with the relative angle θ as shown by a curve Q2 shown in FIG. 7. From the calculation results, when the relative angle θ is within a range from about 15° to about 30°, it is difficult to see the moire fringes. This is substantially the same as the observation result in the above experiment.

In a case where the relative angle θ falls within a range from about 30° to about 45°, to make the moire fringes disappear, the difference between the lattice intervals of the lattices L1 and L2 may be decreased (the value of "a" may be decreased). In a case where the relative angle θ falls within a range from about 0° to about 15°, to make the moire fringes disappear, the difference between the lattice intervals of the lattices L1 and L2 may be increased (the value of "a" may be increased).

In addition, in the touch panel under the above conditions, when the relative angle θ is equal to about 21°, it is most difficult to see the moire fringes. This angle of 21° is a substantially central angle in the ranges R1 and R2 within which it is difficult to see the moire fringes.

A description will now be given, with reference to FIG. 8, of a second embodiment of the present invention.

Figure 8:
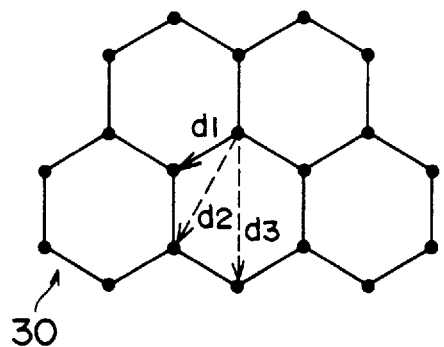
FIG. 8 is a diagram illustrating an arrangement of dot spacers of the input panel in the touch panel according to a second embodiment of the present invention.

In the second embodiment, the dot spacers 30 are arranged, as shown in FIG. 8, in the input panel 20. That is, the dot spacers 30 are on vertexes of orthogonal hexagons spread all over a plane. In this case, the distance between adjacent dot spacers 30 may be one of d1, d2 and d3. Since the distance between adjacent dot spacers 30 is limited to one of three values, input operation of the touch panel can be performed with almost even input load. Thus, stable operation sensing in the touch panel can be obtained.

In the touch panel (the input device) according to the second embodiment, the display elements 15 of the display unit 10 are arranged in the lattice. Thus, a number of periodical interferences between the display elements 15 and the dot spacers 30 arranged as shown in FIG. 8 is reduced. As a result, moire fringes hardly appear on the input panel 20.

A description will now be given, with reference to FIG. 9, of a third embodiment of the present invention.

Figure 9:
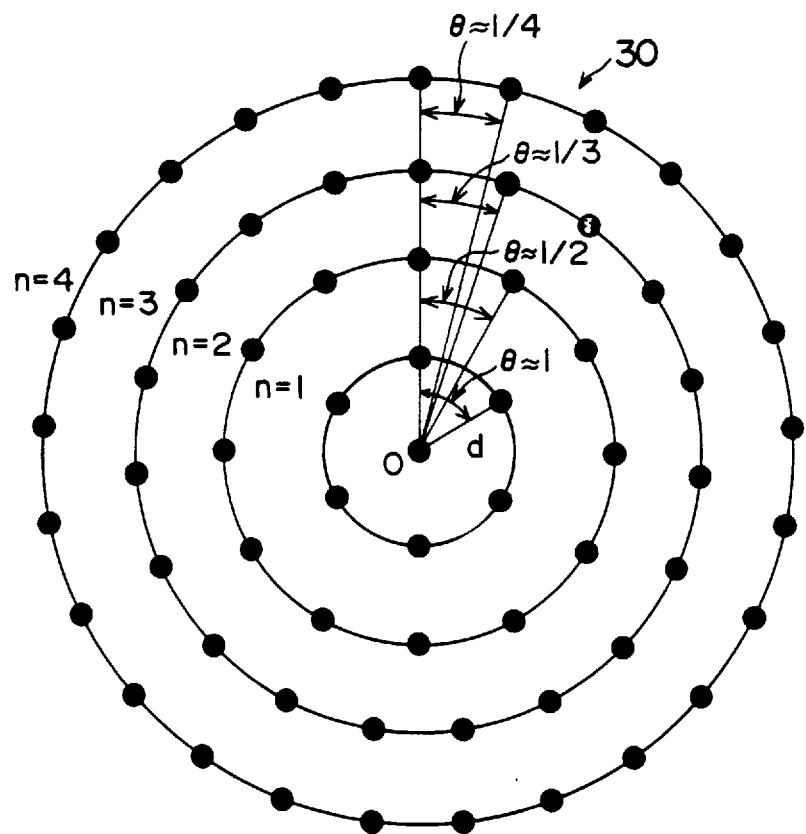
FIG. 9 is a diagram illustrating an arrangement of dot spacers of an input panel in a touch panel according to a third embodiment of the present invention.

In the third embodiment, the dot spacers 30 of the display panel 10 are arranged as shown in FIG. 9. Referring to FIG. 9, the dot spacers 30 are arranged on concentric circles arranged at radials intervals d. On the n-th concentric circle, an angle formed by lines respectively connecting the center 0 and adjacent dot spacers on the nth concentric circle is set at 1/n radians. According to the arrangement of the dot spacers 30, the length of an (of the n-th concentric circle) between the adjacent dot spacers 30 on an nth concentric circle is a constant value d (=nd×1/n). That is, the distance between the adjacent dot spacers 30 is always equal to a constant value d of the intervals between the concentric circles.

Since the distance between adjacent dot spacers 30 is substantially constant, input operation of the touch panel (the input device) can be performed with an almost even input load. Thus, stable operation sensing in the touch panel can be obtained.

In addition, since a number of periodical interferences between the display elements 15 and the dot spacers 30 arranged as shown in FIG. 9 is reduced in the same manner as in the case shown in FIG. 8, moire fringes hardly appear on the input panel 20.

In the third embodiment, the angle θ is not limited to 1/n radians. The angle θ may be equal to C/n1radians (C is a constant). In this case, the distance between adjacent dot spacers 30 is substantially equal to a constant value Cd (=nd×C/n).

The present invention is not limited to the aforementioned embodiments, and other variations and modifications may be made without departing from the scope of the claimed invention.

What is claimed is:

1. A touch panel, comprising:
   a display unit having display elements arranged in a lattice; and
   an input panel, disposed on said display unit, comprising transparent resistive films spaced at a predetermined distance by a plurality of insulating dot spacers two-dimensionally arranged on vertexes of orthogonal hexagons lying in a plane therebetween and formed.

2. An input panel used in a touch panel, said input panel comprising:
   a transparent substrate; and
   transparent resistive films provided on said transparent substrate, said transparent resistive films being spaced at a predetermined distance by a plurality of insulating dot spacers which are two-dimensionally arranged on vertexes of orthogonal hexagons lying in a plane disposed between, and in parallel to, the films.

3. A touch panel as claimed in claim 2, wherein a distance between each insulating dot spacer and each of plural and respectively adjacent insulating dot spacers located at respective vertexes of a common orthogonal hexagon is one of three fixed and different, but substantially equal distances.

4. A touch panel, comprising:
   a display unit having display elements arranged in a lattice; and
   an input panel, disposed on said display-unit, comprising transparent resistive films formed on a transparent substrates, the transparent resistive files being spaced at a predetermined distance by a plurality of insulating dot spacers and wherein the plurality of insulating dot spacers is arranged two-dimensionally, on respective vertexes of orthogonal hexagons spaced in a plane and disposed between the films, with a periodicity of the respective spacings between each insulating dot spacer and the plural insulating dot spacers respectively adjacent thereto selected to produce a reduced number of periodical interferences between the display elements and the insulating dot spacers, in a display produced on the touch panel, relatively to a number thereof produced by a random arrangement of the insulation dot spacers.

5. A touch panel, comprising:
   a display unit having display elements arranged in a lattice; and
   an input panel, disposed on said display unit, comprising transparent resistive films formed on a transparent substrate, the transparent resistive films being spaced at a predetermined distance by a plurality of insulating dot spacers and wherein the plurality of insulating dot spacers is two-dimensionally arranged in a plane disposed between the films, a distance between each insulating dot spacer and each of plural and respectively adjacent insulating dot spacers located at respective vertexes of a common orthogonal hexagon being a selected one of three fixed and different, but substantially equal, distances and a periodicity of the respective spacings between each insulating dot spacer and the plural insulating dot spacers respectively adjacent thereto being selected to produce a reduced number of periodical interferences between the display elements and the insulating dot spaces, in a display produced on the touch panel, relatively to a number thereof produced by a random arrangement of the insulating dot spacers.

6. An input panel for a touch panel, said input panel comprising:

a transparent substrate; and transparent resistive films provided on said transparent substrate, said transparent resistive films being spaced at a predetermined distance by a plurality of insulating dot spacers two-dimensionally arranged on respective vertexes of orthogonal hexagons spaced in a plane disposed between the films, with a periodicity of the respective spacings between each insulating dot spacer ad the plural insulating dot spacers respectively adjacent thereto being selected to produce a reduced number of periodical interferences between the insulating dot spacers and display elements of the touch panel, in a display produced on the touch panel, relatively to a number thereof produced by a random arrangement of the insulating dot spacers.

7. A touch panel as claimed in claim 6, wherein a distance, between each insulating dot spacer and each of the plural and respectively adjacent insulating dot spacers located at respective vertexes of a common orthogonal hexagon, is one of three fixed and different, but substantially equal, distances.

* * * * *

UNITED STATES PATENT AND TRADEMARK OFFICE
CERTIFICATE OF CORRECTION

PATENT NO.: 5,831,691
DATED : November 3, 1998
INVENTOR(S): Shigemi KURASHIMA et al.

It is certified that error appears in the above-identified patent and that said Letters Patent is hereby corrected as shown below:

Col. 5, line 39, change "angle$\theta$" to --angle $\theta$--.

Col. 6, line 30, change "have respectively" to --have, respectively,--.

Col. 7,
line 47, after "an" insert --arc--.

Col. 8, line 34, change "substrates" to --substrate-- and change "files" to --films--.

Col. 9, line 14, change "ad" to --and--.

Signed and Sealed this

Twenty-seventh Day of April, 1999

Attest:

Q. TODD DICKINSON

*Attesting Officer*     *Acting Commissioner of Patents and Trademarks*